US011539651B2

(12) United States Patent
Page et al.

(10) Patent No.: US 11,539,651 B2
(45) Date of Patent: *Dec. 27, 2022

(54) COOPERATIVE MESSAGING ENVIRONMENTS

(71) Applicant: International Business Machines Corporation, Armonk, NY (US)

(72) Inventors: Simon Page, Southampton (GB); Sean Cawood, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/672,751

(22) Filed: Feb. 16, 2022

(65) Prior Publication Data

US 2022/0174030 A1 Jun. 2, 2022

Related U.S. Application Data

(63) Continuation of application No. 17/028,227, filed on Sep. 22, 2020, now Pat. No. 11,310,187.

(51) Int. Cl.
*H04L 51/234* (2022.01)
*H04L 51/18* (2022.01)
*H04L 51/046* (2022.01)
*H04L 51/226* (2022.01)

(52) U.S. Cl.
CPC .......... *H04L 51/234* (2022.05); *H04L 51/046* (2013.01); *H04L 51/18* (2013.01); *H04L 51/226* (2022.05)

(58) Field of Classification Search
CPC ... H04L 51/234; H04L 51/226; H04L 51/046; H04L 51/81; H04L 51/34; H04L 51/26; H04L 51/18
See application file for complete search history.

(56) References Cited

U.S. PATENT DOCUMENTS

| 6,650,890 B1 | 11/2003 | Irlam |
| 7,664,818 B2 | 2/2010 | Wolber |
| 8,185,912 B1 | 5/2012 | Leonard |

(Continued)

OTHER PUBLICATIONS

Page et al., "Cooperative Messaging Environments", U.S. Appl. No. 17/028,227, filed Sep. 22, 2020, 41 pages.

(Continued)

*Primary Examiner* — Sargon N Nano
(74) *Attorney, Agent, or Firm* — Stephen R. Yoder (57) ABSTRACT

A tool for controlling message distribution in a cooperative messaging environment (CME). The tool determines an availability of a plurality of messaging resources of a cooperative messaging environment (CME). The tool analyzes metadata associated with a first message from a first message producing application to determine an application property. Responsive to receiving a request from a first message consuming application to distribute the first message, the tool associates a first messaging resource of the CME with the first message consuming application. The tool distributes the first message to the first messaging resource of the CME from the first message producing application based, at least in part, on the availability of the plurality of messaging resources of the CME and the application property.

20 Claims, 8 Drawing Sheets

(56) References Cited

U.S. PATENT DOCUMENTS

| | | | |
|---|---|---|---|
| 8,199,668 B2 | 6/2012 | Wallis | |
| 8,386,577 B2 | 2/2013 | Hickson | |
| 9,313,159 B2 | 4/2016 | Ross | |
| 10,491,687 B2 | 11/2019 | Karlsson | |
| 10,664,174 B2 | 5/2020 | Kavanagh | |
| 11,190,459 B2* | 11/2021 | Dick | H04L 47/803 |
| 2003/0031169 A1 | 2/2003 | Harry, III | |
| 2003/0187570 A1 | 10/2003 | Impson | |
| 2004/0139179 A1 | 7/2004 | Beyda | |
| 2006/0059228 A1 | 3/2006 | Kasamsetty | |
| 2008/0004396 A1* | 1/2008 | Lee | B82Y 30/00 423/445 B |
| 2008/0040386 A1* | 2/2008 | Godley | G06Q 10/10 |
| 2008/0040396 A1 | 2/2008 | Wallis | |
| 2008/0134018 A1 | 6/2008 | Kembel | |
| 2011/0142064 A1 | 6/2011 | Dubal | |
| 2014/0149485 A1 | 5/2014 | Sharma | |
| 2015/0271256 A1* | 9/2015 | Pathak | H04L 47/6225 709/223 |
| 2016/0156502 A1* | 6/2016 | Fugitt | H04L 45/04 709/205 |
| 2016/0232045 A1 | 8/2016 | Yeo | |
| 2018/0121103 A1* | 5/2018 | Kavanagh | G06F 3/067 |
| 2018/0278551 A1 | 9/2018 | Carpenter | |
| 2018/0316639 A1 | 11/2018 | Cullen | |
| 2018/0324118 A1* | 11/2018 | Dinh | G06F 9/546 |
| 2019/0268351 A1 | 8/2019 | Qiu | |
| 2019/0317838 A1 | 10/2019 | Kavanagh | |
| 2019/0317873 A1* | 10/2019 | Gopisetti | G06F 11/3423 |
| 2019/0349312 A1* | 11/2019 | Dick | H04L 47/78 |
| 2021/0176326 A1* | 6/2021 | Carley | G06F 9/546 |

OTHER PUBLICATIONS

Bm, "List of IBM Patents or Patent Applications Treated as Related", Appendix p. 2 p. dated Feb. 16, 2022.

\* cited by examiner

COOPERATIVE MESSAGING ENVIRONMENTS

BACKGROUND OF THE INVENTION

The present invention relates to Cooperative Messaging Environments (CMEs), and more particularly, to concepts for controlling message distribution in a CME.

In conventional messaging systems, the communication routes between brokers are statically defined at system setup, often based on the connections of message consumers who exist at the time the network is first configured. Such systems typically follow a publish and subscribe (i.e., pub-sub) model of message distribution, forwarding all messages from message producers (i.e., message producing applications) to all brokers (and thus to message consuming applications) in the network because a consumer for any particular message may potentially be connected to any broker in the network.

Cooperative Messaging Environments (CMEs) are used for communicating messages from message producing applications to message consuming applications. When a consuming application that is serving a specific messaging resource (e.g., messaging queue) on a server goes down, there is some time before the messages will be routed from that resource to another resource (e.g. another server with an instance of the messaging resource) that has the appropriate consuming application.

SUMMARY

Aspects of an embodiment of the present invention disclose a method, a computer program product, and a computer system for controlling message distribution in a cooperative messaging environment (CME). The method includes determining an availability of a plurality of messaging resources of a cooperative messaging environment. The method further includes analyzing metadata associated with a first message from a first message producing application to determine an application property. Responsive to receiving a request from a first message consuming application to distribute the first message, the method further includes associating a first messaging resource of the CME with the first message consuming application. The method further includes distributing the first message to the first messaging resource of the CME from the first message producing application based, at least in part, on the availability of the plurality of messaging resources of the CME and the application property.

BRIEF DESCRIPTION OF THE DRAWINGS

Preferred embodiments of the present invention will now be described, by way of example only, with reference to the following drawings, in which.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

Proposed are concepts for controlling message distribution in a cooperative messaging environment, CME. Such concepts may provide improved control over message distribution and this may be achieved, for example, based on one or more target destinations (e.g., messaging queues) that are actively being held open by suitable applications. For instance, metadata associated with a message may be used to determine an application requirement. Such metadata may be incorporated into the message, or provided separately from the message and associated with the message (e.g., via a link or accompanying data file). The metadata may therefore be thought of as being supplementary data providing information about the message, and this data may be of any suitable format such a human-readable code (e.g. user-created annotations) and/or machine-readable code (e.g., software generated data tags). Standard/conventional parsing and analysis technique may thus be used to analyze metadata of a message. The metadata may comprise structured data and/or unstructured data. The metadata may describe a requirement of an application (such as property or functionality) in order for the message to be consumed. By way of example, metadata provided with a message may specify an application requirement of the message, such as speed, capacity, memory size, message protocol, format, etc.). The availability of messaging resources (such as a messaging queue) linked to applications meeting the determined application requirement may then be assessed in order to identify which resource(s) to route the message to.

Proposed are concepts for passing messages into a CME from a message producing application whilst simultaneously identifying a type of message consuming application that the message should be consumed by. This may be done at the point when a messaging resource is opened by the message producing application (for example, through the provision of metadata associated with the message). In this way, a system designer may identify/choose the types of messaging consuming applications that the messages can be routed to. Routing of messages in the CME may then be based upon both their availability and the types of messages that they can consume.

Proposed embodiments thus seek to identify the message consuming application(s) that will consume the messages produced by an application at the earliest possible point from when it opens a destination in message queuing environment (such as a large cooperative messaging environment). By achieving this early through synchronous means, produced messages may be routed more efficiently throughout the messaging environment. An increased quality of delivery may also be achieved.

Embodiments may address an issue that when there are many instances of the same named messaging resources in a messaging environment (e.g., MQ clusters), it may be desirable to balance workload messages across instances of the messaging resource used with a certain type of message consuming application.

Embodiments may also ensure that messages are not waiting around for long after being sent to a messaging resource that has just had its serving application go down. The messages may, instead, be quickly rerouted to another instance of the messaging resource that has an appropriate application serving it. Thus, improved performance may be obtained when dealing with application outages.

According to an exemplary proposal, there may be provided a computer-implemented method of controlling message distribution in a CME. Such an exemplary method includes determining an availability of each of a plurality of messaging resources of the CME, where each messaging resource is associated with a respective message consuming application. For each messaging resource, a property of its associated message consuming application is determined. Distribution of a message from a message producing application to one or more of the messaging resources is then controlled based on: metadata associated with the message; the availability of each messaging resource; and the property of the message consuming application associated with each messaging resource.

By way of further example, controlling distribution of a message in the method of the preceding paragraph may include receiving the message from the message producing application and then analyzing the metadata associated with the message to determine a required application property. A candidate messaging resource associated with a message consuming application that satisfies the required application property can then be identified. Based on the determined availability of the candidate messaging resource, communication of the message can then be controlled (e.g., transmitted if the candidate messaging resource is available, or not transmitted to the candidate messaging resource if unavailable). In this way, embodiments may control message distribution in consideration of an application requirement that is indicated by metadata associated with (e.g., linked to, or incorporated into) the message. Such control can also take account of an application's availability (e.g., operating status).

In order to ensure that information or knowledge relating to the availability of the messaging resources is easily accessible and/or up to date, a record of opened messaging resources of the CME may be maintained by some embodiments. For instance, a server component of the CME may store and maintain a record (e.g., data file, table or other data store) comprising information relating to the status of all messaging resources of the CME. To ensure that such a record is accurate and up-to-date, embodiments may comprise the step of: monitoring an operational status of each of the opened messaging resources; and responsive to identifying a change in operational status of an opened messaging resource, updating the record based on the identified change in operational status. In this way, any changes in status of the messaging resources may be automatically detected and recorded.

Proposed embodiments may also be configured to create an instance of a message resource upon receiving a request or notification from a message consuming application. For example, an embodiment may include: responsive to receiving a request from a first message consuming application, opening (i.e., provisioning or initiating) a first messaging resource of the CME and associating the first messaging resource with the first message consuming application. In this way, embodiments may provide for the creation/provision of a messaging resource linked to a message consuming application. Furthermore, embodiments may also include a process of analyzing metadata associated with the first message consuming application to identify a property of the first message consuming application. In this way, knowledge of the consuming application's capabilities, restrictions and/or constraints may be obtained (e.g., for comparison against a message requirement).

Some embodiments may be configured to create an instance of a message resource upon receiving a request or notification from a message producing application. For example, a proposed embodiment may include: responsive to receiving a request from a first message producing application, opening a second messaging resource of the CME and associating the second messaging resource with a second consuming application. In this way, embodiments may provide for the automatic creation/provision of a messaging resource based on a received message. Furthermore, embodiments may also include a process of analyzing metadata associated with the first message producing application to identify a property of the second message consuming application. In this way, knowledge of the newly opened consuming application's capabilities, restrictions and/or constraints may be determined.

Proposed embodiments may thus accommodate for application scaling by allowing a user to add more instances of the same messaging resources and applications without effecting existing processing and workload balancing of messages across a messaging infrastructure.

Further, Embodiments may facilitate faster re-routing of messages to other instances of the message consuming applications when a target/intended message consuming application is unavailable (e.g., down or experiencing an outage).

Embodiments may also allow a user to workload balance messages against only the instances of the messaging resource that are opened by a required message consuming application (instead of all messaging resource instances).

Exemplary embodiments may be advantageous as a result of being able to:

(I)—Allow message producing applications to open a messaging resource with new options to indicate that they would like to use this behaviour whilst they have this messaging resource open.

(II) Allow message consuming applications to open a messaging resource and link it with some metadata about what types of messages it can consume.

(III) Allow the producing application to specify metadata about what type of message consuming applications can process the messages it is producing with each message that it is produces when it is passed to the messaging resource that it has open.

According to some proposed concepts, metadata for each message may be matched up with instances of target messaging resources (e.g., messaging queues) that have been opened by a message consuming application with the same metadata. In this way, a subset of all instances of the messaging resources can be determined and the messages will only be workload balanced across this subset.

Such a proposed approach to message distribution may be further configured to allow the specification of a parameter value which indicates how many different instances of the appropriate target messaging resources should be allowed into the subset. For instance, in a situation where there are one thousand available messaging resources, a user may only want to bind to five (so as to avoid the overhead of all the network traffic when connecting up all of the messaging resources that could be sent the messages for example).

Figure 1:
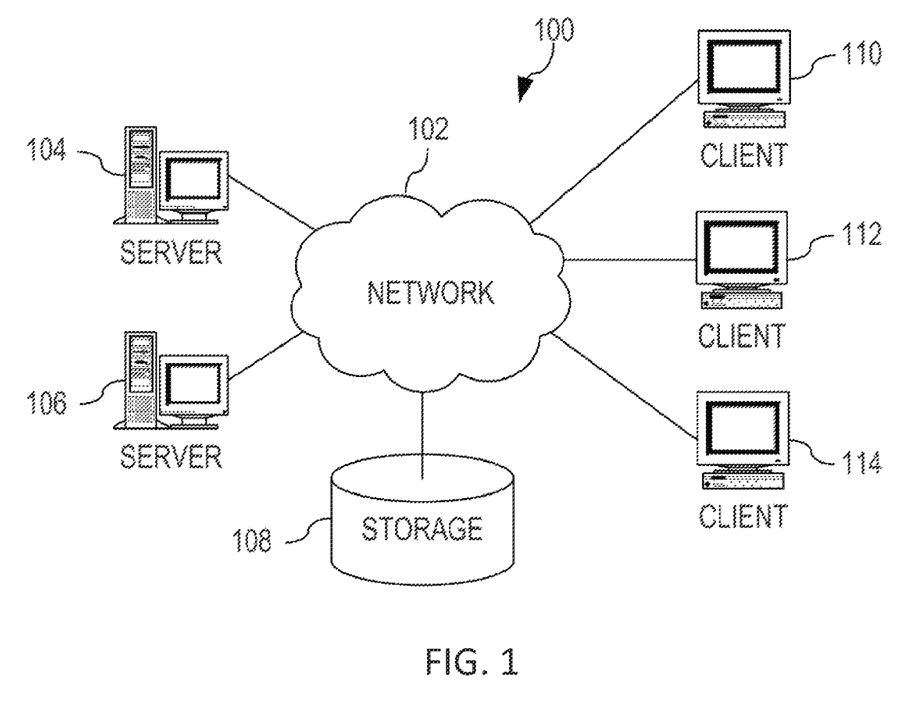
FIG. 1 depicts a pictorial representation of an example distributed system in which aspects of the illustrative embodiments may be implemented.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
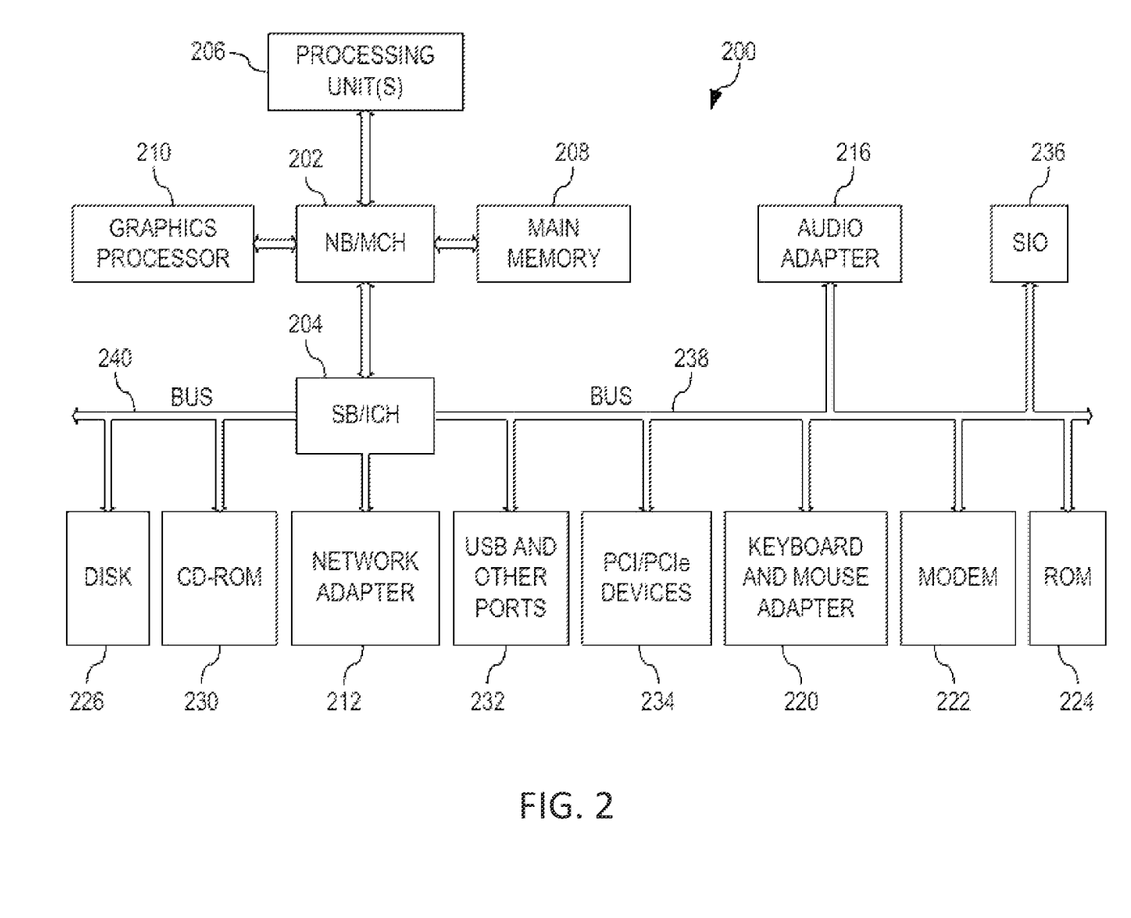
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, a proposed embodiment may be partly implemented in a processing unit 206 of the system 200.

In the depicted example, the system 200 employs a hub architecture including a north bridge and memory controller hub (NB/MCH) 202 and a south bridge and input/output (I/O) controller hub (SB/ICH) 204. Thus, another proposed embodiment may be implemented in the memory controller hub 202 of the system 200. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200. Java and all Java-based trademarks and logos are trademarks or registered trademarks of Oracle and/or its affiliates.

As a server, system 200 may be, for example, an IBM® eServer™ System p5® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM, eServer, AIX, and System p5 are trademarks of International Business Machines Corporation, registered in many jurisdictions worldwide. Linux is a registered trademark of Linus Torvalds in the United States, other countries, or both.

Instructions for the operating system, the programming system, and applications or programs are located on storage devices, such as HDD 226, and may be loaded into main memory 208 for execution by processing unit 206. Similarly, one or more programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3A:
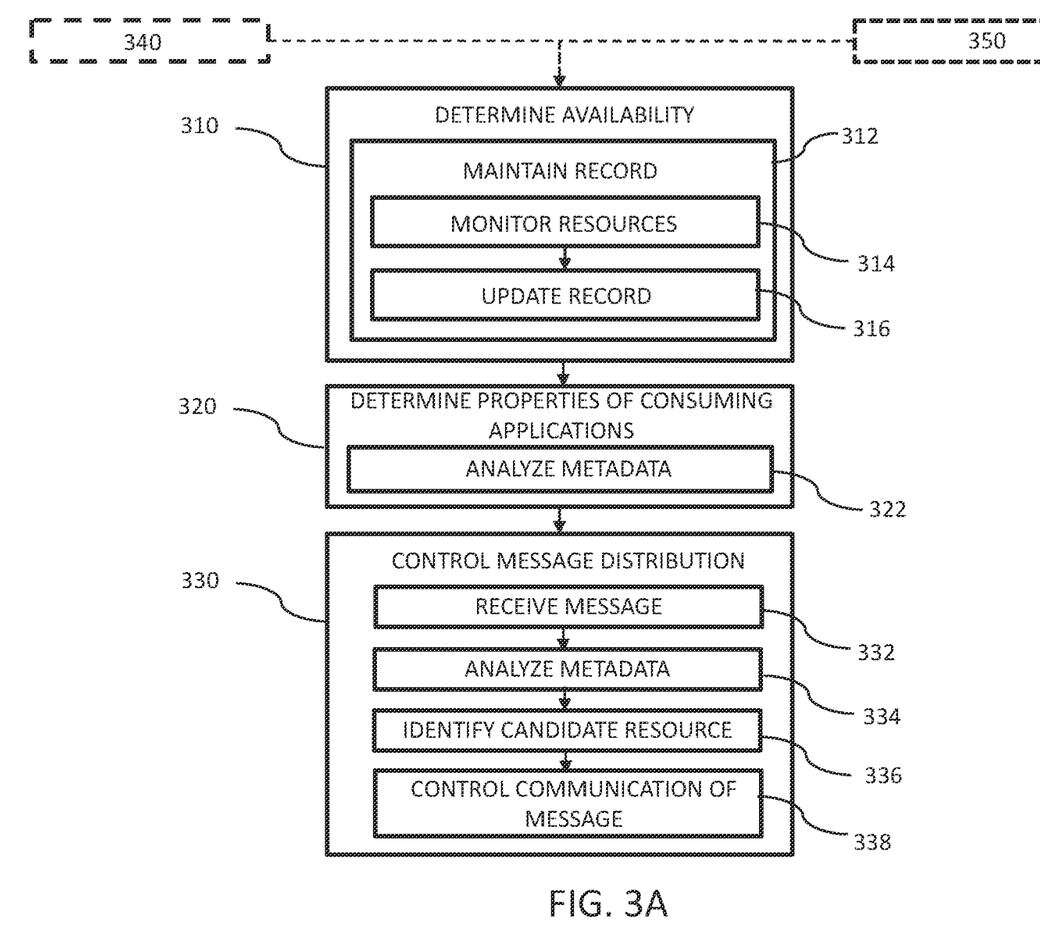
FIG. 3A depicts a flow diagram of a computer-implemented method of controlling message distribution in a CME according to a proposed embodiment.

Referring to FIG. 3A, there is depicted a flow diagram of a computer-implemented method of controlling message distribution in a CME according to a proposed embodiment.

Here, the CME is formed from a distributed communication network and is adapted to communicate messages from a message producing application to a message consuming application. The CME thus comprises a plurality of messaging resources that are configured to facilitate consumption of messages by the message consuming applications. More specifically, in this exemplary embodiment, each active/available message consuming application is provided with an associated messaging resource, namely an instance of a messaging queue. Put another way, each messaging resource (e.g., messaging queue instance) is associated with a respective message consuming application.

The method begins with step 310 of determining (at a server component of the CME) an availability of each of a plurality of messaging resources of the CME. More specifically, in this exemplary embodiment, the step 310 of determining an availability of each of a plurality of messaging resources of the CME comprises (312) maintaining a record (i.e., data structure or information resource) of opened messaging resources of the CME. Here, the step 312 of maintaining a record of opened messaging resources comprises two sub-steps 314 and 316. In sub-step 314, an operational status of each of the opened messaging resources is monitored (e.g., for changes). Then, responsive to identifying a change in operational status of an opened messaging resource, the record is updated (based on the identified change in operational status) in sub-step 316.

Step 320 of the method comprises, for each messaging resource, determining a property of its associated message consuming application. More specifically, determining a property of a message consuming application comprises analyzing (322) metadata associated with the message consuming application to determine a property of the message consuming application. Thus, it will be appreciated this embodiment employs the concept of using metadata to indicate one or more properties of a message consuming application. For instance, metadata may include an indication of: a constraint; requirement; operating parameter; speed; accuracy; performance; or any other property of a message consuming application that may be useful for determining it suitability/ability to consume messages. In this way, there is provided an approach to identifying a property of the message consuming application in a relatively simple and accurate manner.

The method then proceeds to step 330 of controlling distribution of a message from a message producing application to one or more of the messaging resources based on: metadata associated with the message; the availability of each messaging resource; and the property of the message consuming application associated with each messaging resource. More specifically, in this exemplary embodiment, the step 330 of controlling distribution of a message comprises first 332 to fourth 338 sub-steps. The first sub-step 332 comprises receiving (at the server component of the CME) the message from the message producing application. Next, in sub-step 334, metadata associated with the message is analyzed to determine a required application property. This may, for example, include identifying a minimum free/available capacity required of a message consuming application. Step 336 then comprises identifying a candidate messaging resource that is associated with a message consuming application having a property which satisfies the required application property. Finally, in step 338, communication of the message to the candidate messaging resource is controlled based on its determined availability. Specifically, in this example, the message is only transmitted to the candidate messaging resource if it is determined that the candidate messaging resource is available. In this, communication of the message to an unavailable candidate message resource may be avoided.

It will be appreciated that, in the above exemplary embodiment, messaging resources and associated message consuming application may already be provisioned/opened. However, proposed embodiments may support the opening/provisioning of messaging resources and associated message consuming applications, and this may, for example be done in response to a request from a message consuming application or a message producing application. For this reason, the flow diagram of FIG. 3A also includes steps 340 and 350 in dashed lines.

Figure 3B:
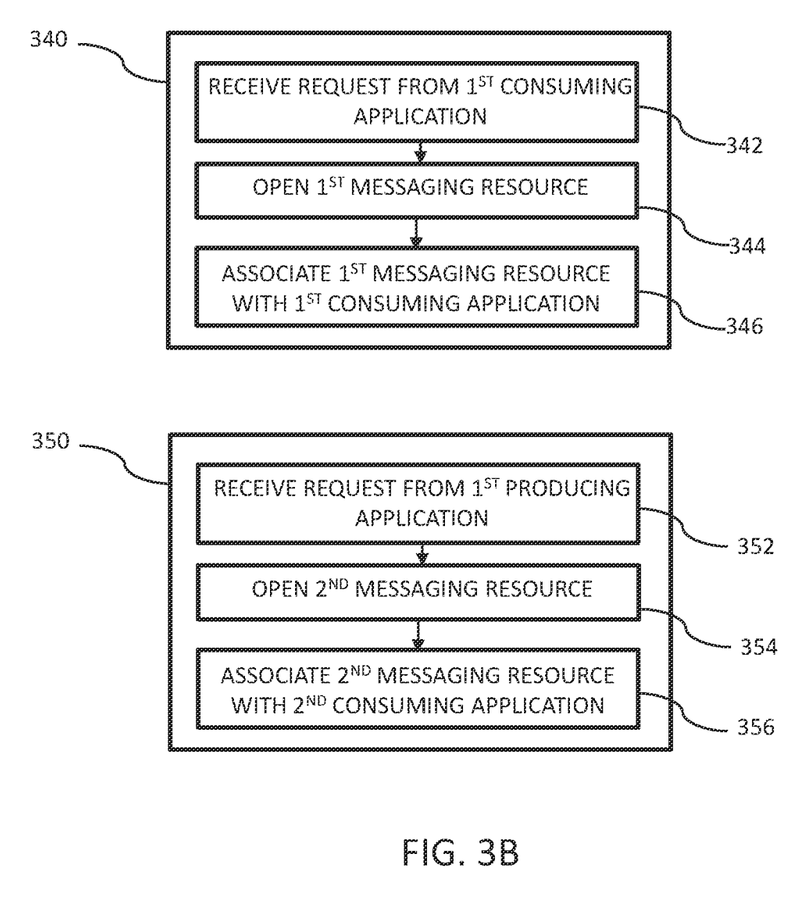
FIG. 3B shows steps 340 and 350 of FIG. 3A in more detail.

Referring to FIG. 3B, steps 340 and 350 of FIG. 3A are shown in more details.

Step 340 comprises three sub-steps 342, 344 and 346. Step 342 comprises receiving a request from a first message consuming application. Then in step 344, responsive to receiving the request from the first message consuming application, a first messaging resource of the CME is opened (i.e., provisioned or initiated) and the first messaging resource is associated with the first message consuming application. Then, in step 346, metadata associated with the first message consuming application is analyzed to identify a property of the first message consuming application.

In this way, step 340 facilitates the opening/provisioning of a messaging resource and associated message consuming application by a message consuming application. This may, for example, enable a message consuming application to define an associated property (e.g., functional constraint or requirement) that indicates what message it can (or cannot) process.

Similarly, step 350 comprises three sub-steps 352, 354 and 356. Step 352 comprises receiving a request from a first message producing application. Then in step 354, responsive to receiving the request from the first producing application, metadata associated with the first message producing application is analyzed to identify a required property (e.g., message type, available capacity, minimum speed, protocol, format, etc.) of a message consuming application. Then, in step 356, a second messaging consuming application having the required property is identified and a second messaging resource is opened (i.e., provisioned or initiated) and associated with the second message consuming application.

Thus, step 350 facilitates the opening/provisioning of a messaging resource and associated message consuming application by a message producing application. This may, for example, enable a message producing application to define an associated property (e.g., functional constraint or requirement) that must be adhered to in order for a message consuming application to process its message(s).

Figure 4:
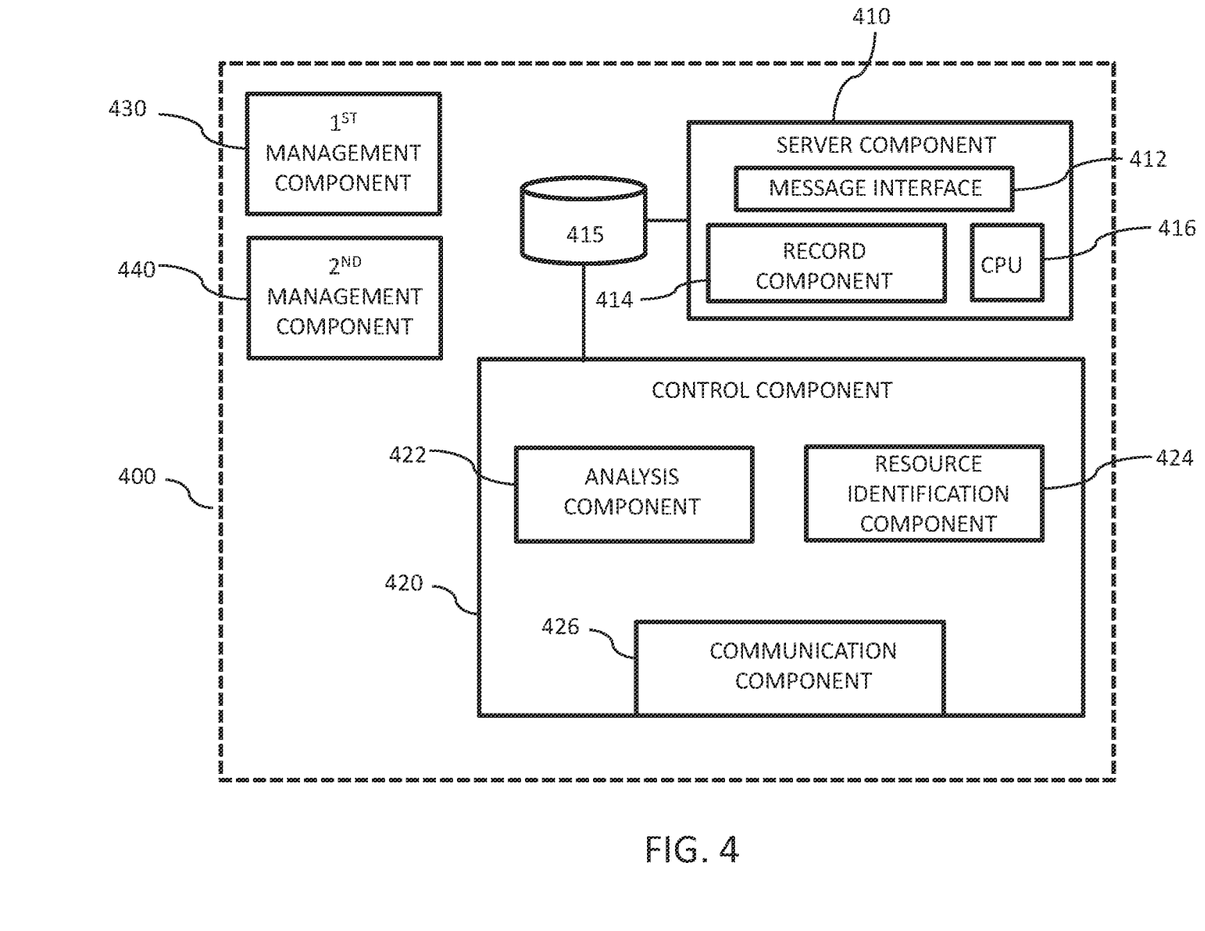
FIG. 4 is a simplified block diagram of a proposed system according to an embodiment.

Referring to FIG. 4, there is depicted a simplified block diagram of system according to a proposed embodiment.

The system 400 is for controlling message distribution in a CME. Here, the CME is a cloud-based service that is adapted to communicate messages from a message producing application to a message consuming application. The CME thus comprises a plurality of messaging resources that are configured to facilitate consumption of messages. More specifically, in this exemplary embodiment, each active/available message consuming application has an associated messaging resource e.g., messaging queue instance).

The system comprises a server component 410, a control component 420, a first management component 430 and a second management component 440.

The server component 410 is configured to determine an availability of each of a plurality of messaging resources of the CME.

More specifically, in this example, the server component comprises a message interface 412 that is configured to receive messages from one or more message producing applications.

The server component 410 also comprises a record component 414 that is adapted to maintain a record of opened messaging resources of the CME. For this purpose, the record component 414 is configured to access a data store 415 of the system 400. The data store 415 is configured to store the record (e.g., as a data file, table, chart or other representation of information) and record component 414 accesses the data store to read, write or modify data of the records Specifically, the record component 414 is configured to: monitor an operational status of each of the opened messaging resources; and, responsive to identifying a change in operational status of an opened messaging resource, update the record based on the identified change in operational status.

The server component also comprises a metadata analysis component 416 configured to analyze metadata associated with a message consuming application to determine a property of the message consuming application.

The control component 420 is configured to control distribution of a message from a message producing application to one or more of the messaging resources based on: metadata associated with the message; the availability of each messaging resource; and the property of the message consuming application associated with each messaging resource.

Specifically, in the example of FIG. 4, the control component 420 comprises an analysis component 422 that is configured to analyze the metadata associated with a received message to determine a required application property. The control component 420 also comprises a resource identification component 424 that is configured to identify a candidate messaging resource that is associated with a message consuming application having a property which satisfies the required application property (determined by the analysis component 422). A communication component 426 of the control component 420 is configured to control communication of the message to the candidate messaging resource based on its determined availability. For this, the communication component queries the record of opened messaging resources of the CME (stored by the data store 415) to determine the availability of the candidate messaging resource. If the communication component 426 determines from the record of opened messaging resources of the CME that the candidate messaging resource is available (e.g., open and available for use), the communication component 426 communicates the message to the candidate messaging resource. Conversely, if the communication component 426 determines from the record of opened messaging resources of the CME that the candidate messaging resource is not available (e.g., not open), the communication component 426 does not communicate the message.

To support the opening/provisioning of messaging resources and associated message consuming applications (by message producing applications and message consuming application), the system 400 of this embodiment also comprises first 430 and second 440 management components.

Responsive to receiving a request from a first message consuming application, the first management component 430 is configured to open a first messaging resource of the CME and associate the first messaging resource with the first message consuming application. The first management component 430 thus facilitates the opening/provisioning of a messaging resource and associated message consuming application by a message consuming application.

Similarly, responsive to receiving a request from a first message producing application, the second management component 440 is configured to determine if an appropriate message consuming application is available. To undertake such a determination, the second management component analyzes information provided with the request. Such information may be included in the request, or associated with the request, and define a required property (e.g., functional constraint or requirement. If no messaging resource having the property is open or available, the second management component opens a second messaging resource of the CME and associates a second messaging resource with the second message consuming application. The second management component 440 therefore facilitates the opening/provisioning of an appropriate messaging resource and associated message consuming application by a message producing application. In this way, a message producing application may define an associated property (e.g., functional constraint or requirement) that must be adhered to in order for a message consuming application to process its message(s).

Figure 5A:
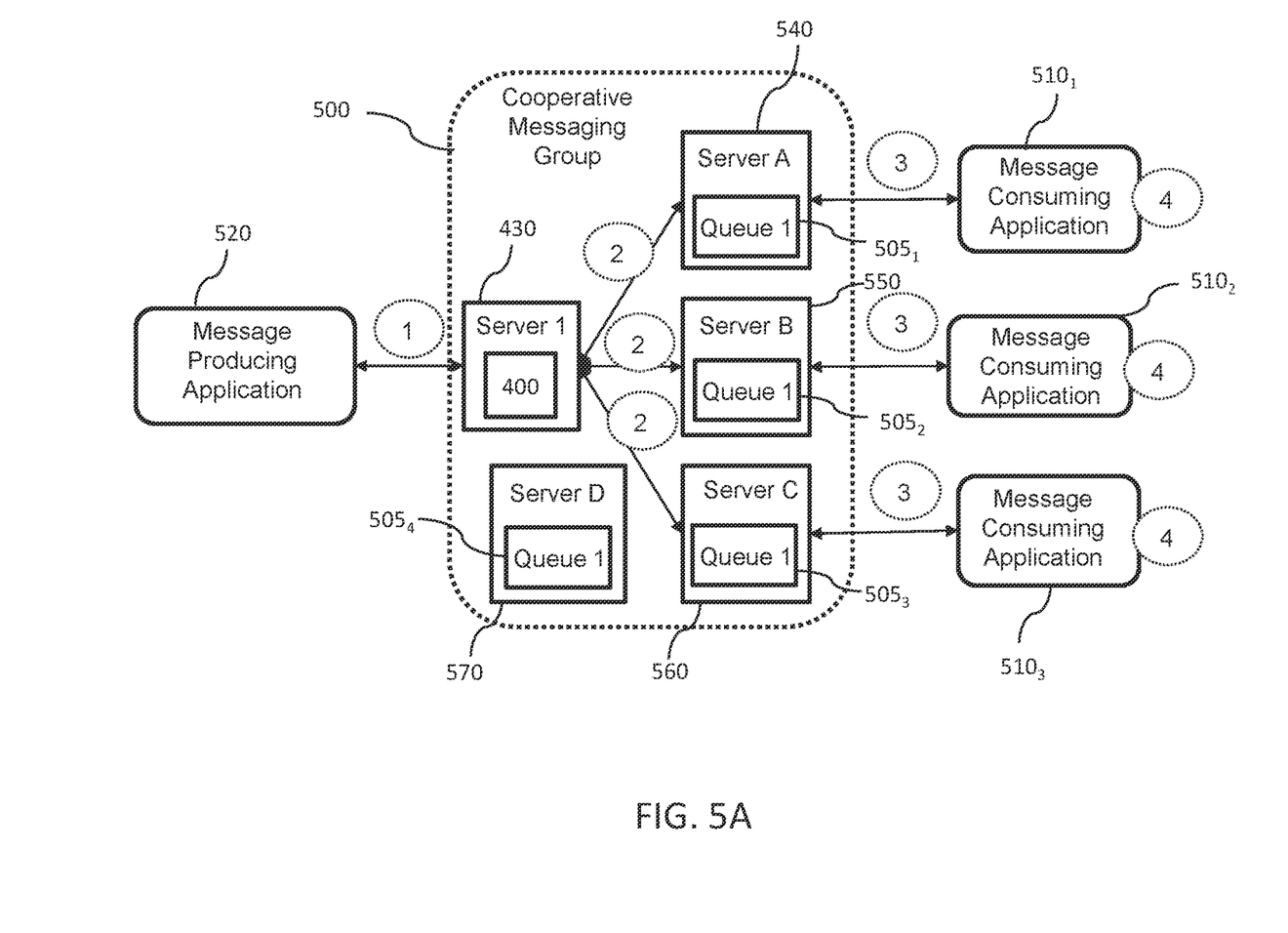
FIG. 5A illustrates the system of FIG. 4 being employed in a CME for workload balancing.

By way of further illustration, FIG. 5A depicts the system 400 of FIG. 4 being employed in a CME 500 for workload balancing.

In particular, the illustration of FIG. 5A demonstrates how proposed embodiments can workload balance message around a CME 500 when there are multiple instances $505_1$, $505_2$, $505_3$, $505_4$ of a messaging resource 505 (i.e., multiple queues each serving an associated message consuming application), but only a subset ($505_1$, $505_2$ & $505_3$) of them have an appropriate message consuming application 510 holding them open.

Here, it is noted that this example assumes that a message producing application 520 has already opened a first 'Queue1' instance $505_1$ a second 'Queue1' instance $505_2$, and a third 'Queue' instance $505_3$, all via a first server 'Server 1' that includes the system 400 of FIG. 4. For instance, this may be done with a bind option to indicate that it wants to bind only on appropriate message consuming applications. The first 'Queue1' instance $505_1$ is hosted by Server A 540, the second 'Queue1' instance $505_2$ is hosted by Sever B 550, and the third 'Queue' instance $505_3$ is hosted by Server C 560. The first 'Queue1' instance $505_1$ serves a first instance $510_1$ of the message consuming application 510. The second 'Queue1' instance $505_2$ serves a second instance $510_2$ of the message consuming application 510. The third 'Queue1' instance $505_3$ serves a third instance $510_3$ of the message consuming application 510. Thus, in this example, the first $510_1$, second $510_2$ and third $510_3$ instances of the message consuming application use Servers A, B and C, respectively.

As depicted by the numbered circles in FIG. 5A, the following exemplary process for managing distribution of a message is implemented:

(1) The message producing application 520 puts messages with metadata to indicate what type of message consuming applications 510 (i.e., consumers) can consume it to the first queue 'Queue1' $505_1$ that it has previously opened.

(2) The system 400 of CME 500 can build up a list that represents the subset of instances of the first 'Queue1' $505_1$ that serve an associated message consuming application with matching metadata for the messages sent by the message in (1). By matching the type of message consuming application with those available, connections can be made between the first 'Server 1' $505_1$ and the subset ('Server A' 540, 'Server B' 550, 'Server C' 560) to workload balance the messages across the multiple instances $505_1$, $505_2$ & $505_3$. In this setup, crucially 'Server D' 570 is not sent any messages and is not be considered until it serves an associated message consuming application with matching metadata for the messages sent by the message producing application 520. The messages from the message producing application 520 are evenly distributed across the instances of 'Queue1' $505_1$, $505_2$ & $505_3$ on 'Server A' 540, 'Server B' 550 and 'Server C' 560.

(3) The first 'Queue1' instance $505_1$ serves the received message(s) to the first instance $510_1$ of the message consuming application 510. The second 'Queue1' instance $505_2$ serves its received message(s) to the second instance $510_2$ of the message consuming application 510. The third 'Queue1' instance $505_3$ serves its received message(s) to the third instance $510_3$ of the message consuming application 510. Thus, in this example, Server D 570 does not receive forward any messages, because it the fourth 'Queue1' instance $505_4$ does not serve a message consuming application with matching metadata for the messages sent by the message producing application 520.

(4) The instances $510_1$, $510_2$ & $510_3$ of the message consuming application are then worked equally as hard as one another to process the sent messages.

Thus, as noted above, although 'Server D' 570 has an instance $505_4$ of 'Queue1', it does not receive any messages sent by the message producing application in (1). This is because it does not serve a message consuming application with a property or requirement identified by metadata of the messages sent by the message producing application 520.

Figure 5B:
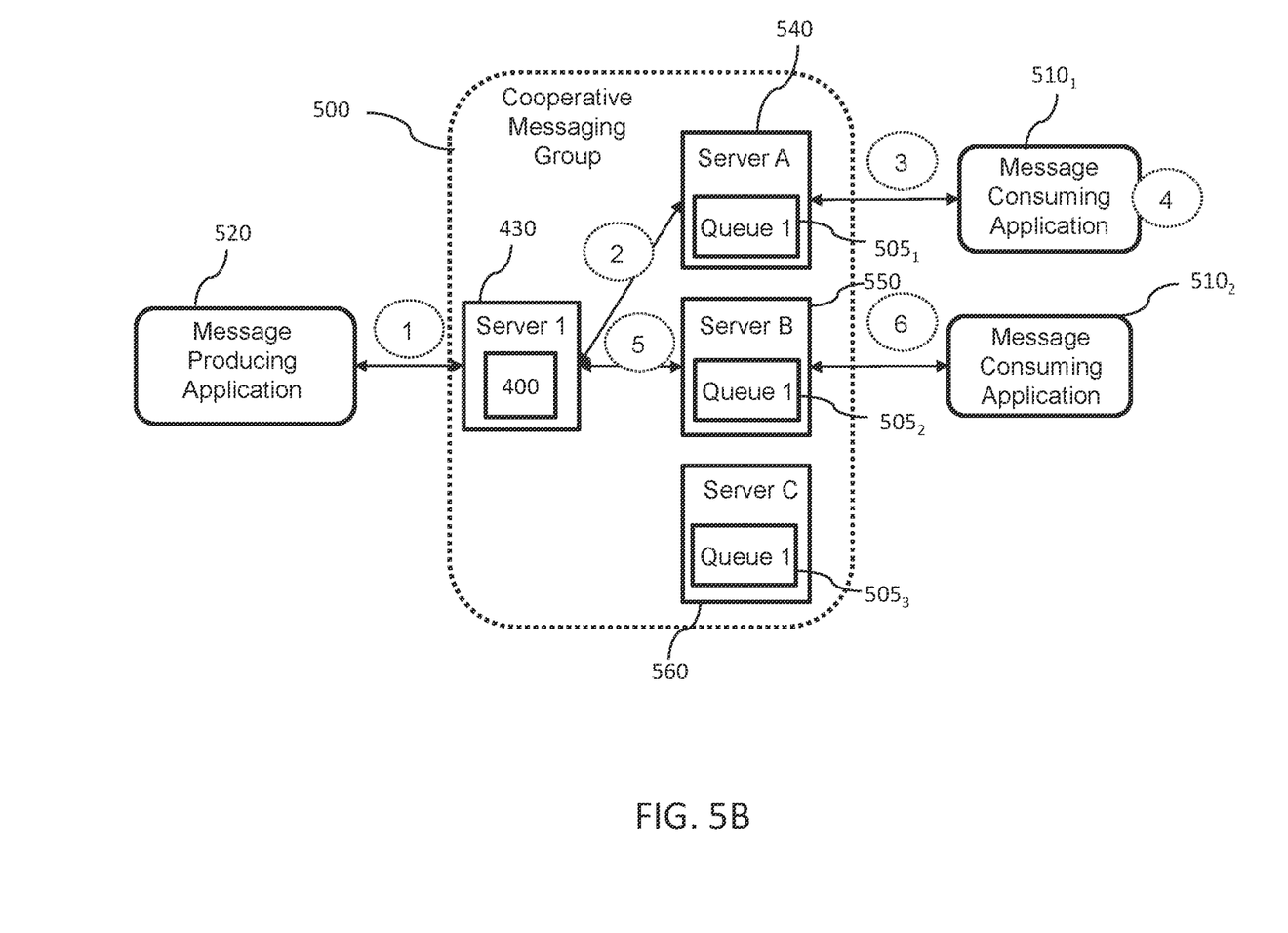
FIG. 5B illustrates the system of FIG. 4 being employed in a CME for failover.

By way of further illustration, FIG. 5B depicts the system 400 of FIG. 4 being employed in a CME 500 for failover.

In particular, the illustration of FIG. 5B demonstrates how proposed embodiments can route messages correctly around a CME in the event that a message consuming application goes down (i.e., become unavailable).

Here, this example assumes that a message producing application 520 has already opened a first 'Queue1' instance $505_1$, a second 'Queue1' instance $505_2$, and a third 'Queue' instance $505_3$, all via a first server 'Server 1' that includes the system 400 of FIG. 4. The first 'Queue1' instance $505_1$ is hosted by Server A 540, the second 'Queue1' instance $505_2$ is hosted by Sever B 550, and the third 'Queue' instance $505_3$ is hosted by Server C 560. The first 'Queue1' instance $505_1$ serves a first instance $510_1$ of the message consuming application 510. The second 'Queue1' instance $505_2$ serves a second instance $510_2$ of the message consuming application 510. Thus, in this example, the first $510_1$ and second $510_2$ instances of the message consuming application use Servers A and B, respectively.

As depicted by the numbered circles in FIG. 5B, the following exemplary process for failover is implemented:

(1) The next message being produced by the message producing application 520 is sent to 'Server 1' 430.

(2) The message is routed to the instance of 'Queue1' $505_1$ on 'Server A' 540 through the use of the metadata as proposed (and previously described above).

(3) The message sits on the instance of 'Queue1' $505_1$ on 'Server A' 540 waiting to be consumed.

(4) The message consuming application $510_1$ for the instance of 'Queue1' $505_1$ on 'Server A' 540 subsequently fails and, as a result, the message is now stuck on instance of 'Queue1' $505_1$ on 'Server A' 540.

(5) The system 400 of Server 1 430 detects the failure of message consuming application $510_1$ and, from its maintained list of instances it already knows the subset of 'Queue1' instances that the message can be sent to, the system 400 immediately re-routes the message to the instance of 'Queue1' $505_2$ on 'Server B' 550. Specifically, it identifies that the second instance of the message consuming application $510_2$ is available and, because it relates to the same message consuming application 510 (i.e., is simply another instance of the same message consuming application 510), it can consume messages of the same type as the first instance $510_1$ of the message consuming application.

(6) The message is now consumed by the second instance of the message consuming application $510_2$ (via the second instance of 'Queue1' $505_2$ on 'Server B' 550).

Consequently, the message is not routed to the instance of 'Queue1' $505_3$ on 'Server C' 560, because the system 400 knows (e.g., from its maintained list of instances) that it does not have an appropriate message consuming application holding its instance of 'Queue1' open.

From the above description, it will be understood that proposed embodiments may provide many advantages, including the following:

Embodiments may allow multiple message consuming applications to coexist serving the same messaging queue (or messaging resource), thus avoiding the need to define a new queue for each message consuming application;

Embodiments may allow for multiple queues that are valid targets for messages to coexist in the same CME, without the message producing application needing to define a new target for each message (or set of messages); and According to proposed embodiments, the explicit final destination of a message may be known to the message producing application before it is put.

Figure 6:
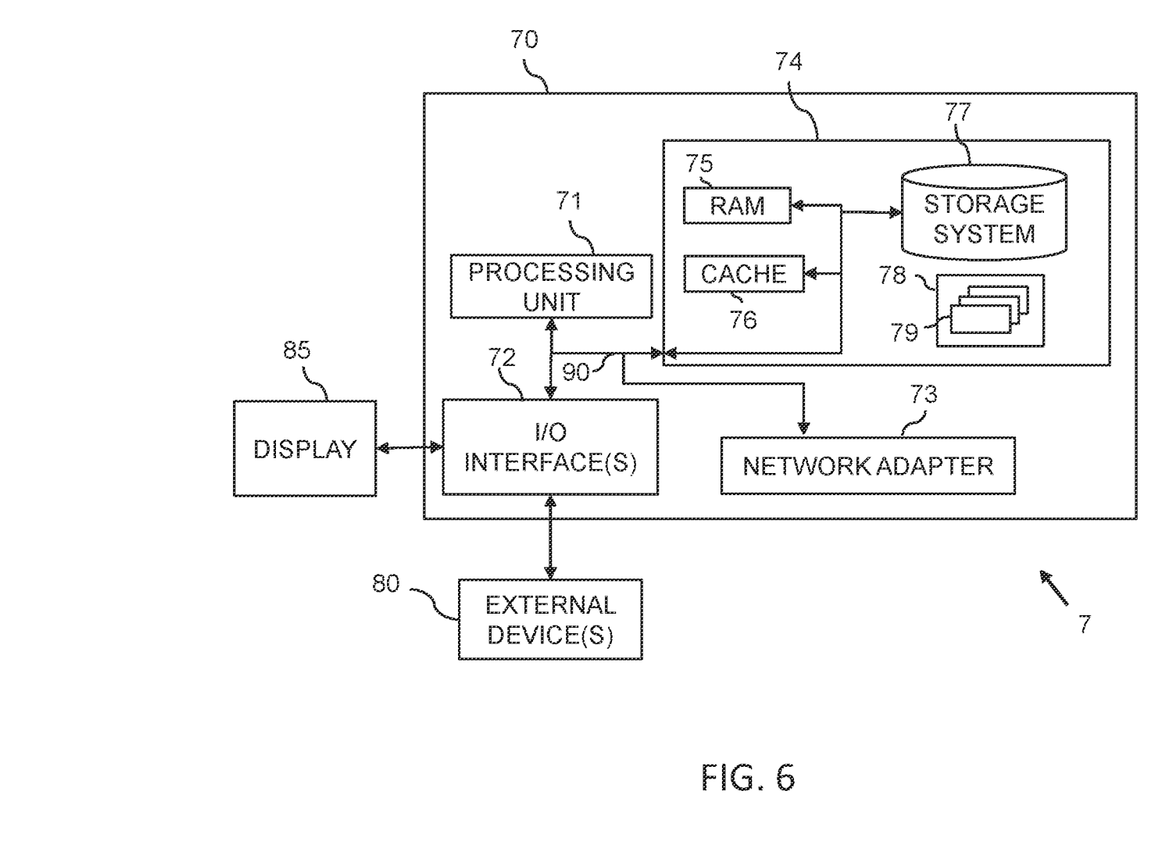
FIG. 6 illustrates a system according to another embodiment.

By way of yet further example, embodiments may comprise a computer system 70, which may form part of a networked system 7 illustrated in FIG. 6. For instance, a control component configured to control distribution of a message from a message producing application to one or more of the messaging resources may be implemented in the computer system 70 (e.g., as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76, and a database storage system, such as storage system 77. Computer system/server 70 may further include other removable/non-removable, volatile/non-volatile computer system storage media, such as storage system 77. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product stored in storage system 77 having program instructions executable by the processing unit 71 to cause the Input/Output (I/O) interface 72 perform a method for controlling message distribution in a CME according to a proposed embodiment. Program/utility 78, having a set (at least one) of program modules 79, may be stored in memory 74. Program modules 79 generally carry out the functions and/or methodologies of proposed embodiments for controlling message distribution in a CME.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g., to communicate with a service mesh).

In the context of the present application, where embodiments of the present invention constitute a method, it should be understood that such a method is a process for execution by a computer, i.e., is a computer-implementable method. The steps of the method therefore reflect various parts of a computer program, e.g., parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining an availability of a plurality of messaging resources of a cooperative messaging environment (CME);
    analyzing metadata associated with a first message from a first message producing application to determine an application property;
    responsive to receiving a request from a first message consuming application to distribute the first message, associating a first messaging resource of the CME with the first message consuming application; and
    distributing the first message to the first messaging resource of the CME from the first message producing application based, at least in part, on the availability of the plurality of messaging resources of the CME and the application property.

2. The computer-implemented method of claim 1, further comprising:
    receiving the first message from the first message producing application; and
    identifying the first messaging resource from the plurality of messaging resources in the CME, wherein the first messaging resource is associated with at least one of one or more message consuming applications having a required application property.

3. The computer-implemented method of claim 1, wherein determining an availability of the plurality of messaging resources of the CME, further comprises:
    maintaining a record of one or more opened messaging resources of the CME.

4. The computer-implemented method of claim 3, wherein maintaining the record of one or more opened messaging resources, further comprises:
    monitoring an operational status of each of the one or more opened messaging resources; and
    responsive to identifying a change in the operational status of at least one of the one or more opened messaging resources, updating the record based, at least in part, on the identified change in the operational status.

5. The computer-implemented method of claim 1, further comprising:
    determining an application property for each of one or more message consuming applications, wherein determining the application property for each of the one or more message consuming applications includes analyzing metadata associated with each of the one or more message consuming applications, wherein the application property for each of the one or more message consuming applications includes an operational parameter.

6. The computer-implemented method of claim 2, further comprising:
    controlling communication of the first message to the first messaging resource based on a determined availability.

7. The computer-implemented method of claim 6, wherein determining the application property further includes analyzing metadata associated with the first message consuming application.

8. The computer-implemented method of claim 1, further comprising:
    responsive to receiving a request from the first message producing application, opening a second messaging resource of the CME and associating the second messaging resource with a second message consuming application.

9. The computer-implemented method of claim 8, further comprising:
analyzing metadata associated with the first message producing application to identify a required application property of the second message consuming application.

10. The computer-implemented method of claim 1, wherein at least one of the plurality of messaging resources includes an instance of a messaging queue.

11. A computer program product comprising:
one or more computer readable storage devices and program instructions stored on the one or more computer readable storage devices, the stored program instructions comprising:
program instructions executable for determining an availability of a plurality of messaging resources of a cooperative messaging environment (CME);
program instructions executable for analyzing metadata associated with a first message from a first message producing application to determine an application property;
program instructions executable for, responsive to receiving a request from a first message consuming application to distribute the first message, associating a first messaging resource of the CME with the first message consuming application; and
program instructions executable for distributing the first message to the first messaging resource of the CME from the first message producing application based, at least in part, on the availability of the plurality of messaging resources of the CME and the application property.

12. The computer program product of claim 11, the stored program instructions further comprising:
program instructions executable for receiving the first message from the first message producing application; and
program instructions executable for identifying the first messaging resource from the plurality of messaging resources in the CME, wherein the first messaging resource is associated with at least one of one or more message consuming applications having a required application property.

13. The computer program product of claim 11, wherein the program instructions executable for determining an availability of the plurality of messaging resources of the CME, further comprise:
program instructions executable for maintaining a record of one or more opened messaging resources of the CME.

14. The computer program product of claim 13, wherein the program instructions executable for maintaining the record of one or more opened messaging resources, further comprise:
program instructions executable for monitoring an operational status of each of the one or more opened messaging resources; and
program instructions executable for, responsive to identifying a change in the operational status of at least one of the one or more opened messaging resources, updating the record based, at least in part, on the identified change in the operational status.

15. The computer program product of claim 11, the stored program instructions further comprising:
program instructions executable for determining an application property for each of one or more message consuming applications, wherein determining the application property for each of the one or more message consuming applications includes analyzing metadata associated with each of the one or more message consuming applications, wherein the application property for each of the one or more message consuming applications includes an operational parameter.

16. The computer program product of claim 12, the stored program instructions further comprising:
program instructions executable for controlling communication of the first message to the first messaging resource based on a determined availability.

17. A computer system comprising:
one or more computer processors;
one or more computer readable storage media; and
program instructions stored on at least one of the one or more computer readable storage media for execution by at least one of the one or more computer processors, the stored program instructions comprising:
program instructions executable for determining an availability of a plurality of messaging resources of a cooperative messaging environment (CME);
program instructions executable for analyzing metadata associated with a first message from a first message producing application to determine an application property;
program instructions executable for, responsive to receiving a request from a first message consuming application to distribute the first message, associating a first messaging resource of the CME with the first message consuming application; and
program instructions executable for distributing the first message to the first messaging resource of the CME from the first message producing application based, at least in part, on the availability of the plurality of messaging resources of the CME and the application property.

18. The computer system of claim 17, the stored program instructions further comprising:
program instructions executable for receiving the first message from the first message producing application; and
program instructions executable for identifying the first messaging resource from the plurality of messaging resources in the CME, wherein the first messaging resource is associated with at least one of one or more message consuming applications having a required application property.

19. The computer system of claim 17, wherein the program instructions executable for determining an availability of the plurality of messaging resources of the CME, further comprise:
program instructions executable for maintaining a record of one or more opened messaging resources of the CME.

20. The computer system of claim 19, wherein the program instructions executable for maintaining the record of one or more opened messaging resources, further comprise:
program instructions executable for monitoring an operational status of each of the one or more opened messaging resources; and
program instructions executable for, responsive to identifying a change in the operational status of at least one of the one or more opened messaging resources, updating the record based, at least in part, on the identified change in the operational status.

* * * * *